C. H. LEGGETT.
ADVERTISING DEVICE.
APPLICATION FILED AUG. 1, 1916.
1,264,946.
Patented May 7, 1918.
2 SHEETS—SHEET 1.
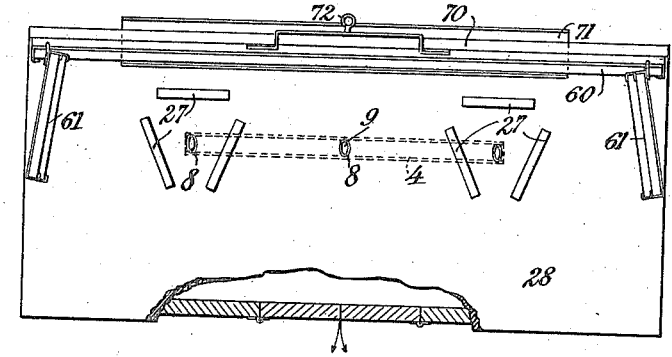
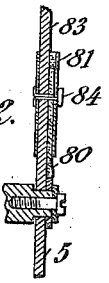
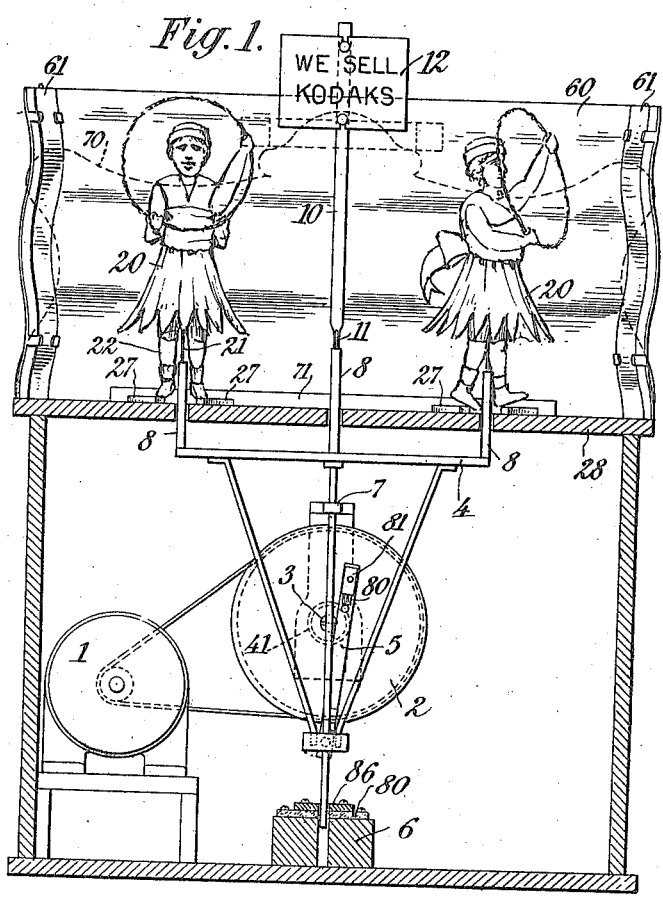
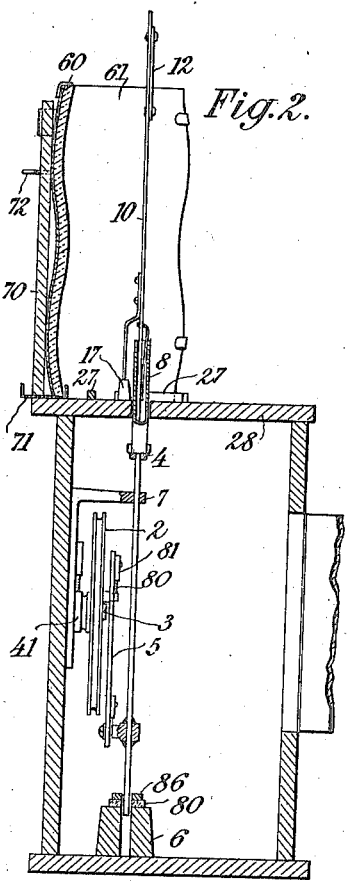
WITNESSES:
INVENTOR:
Clinton H. Leggett
By Attorneys,

C. H. LEGGETT.
ADVERTISING DEVICE.
APPLICATION FILED AUG. 1, 1916.

1,264,946.

Patented May 7, 1918.
2 SHEETS—SHEET 2.

WITNESSES:
René Bruine
Gustave R. Thompson

INVENTOR:
Clinton H. Leggett
By Attorneys,
Fraser Sub. & Musser

UNITED STATES PATENT OFFICE.

CLINTON H. LEGGETT, OF NEW YORK, N. Y.

ADVERTISING DEVICE.

1,264,946.  Specification of Letters Patent.  Patented May 7, 1918.

Application filed August 1, 1916. Serial No. 112,494.

*To all whom it may concern:*

Be it known that I, CLINTON H. LEGGETT, a citizen of the United States of America, residing in the borough of Manhattan, city, county, and State of New York, have invented certain new and useful Improvements in Advertising Devices, of which the following is a specification.

The present invention provides a motor-actuated device, adapted to put various devices in motion, such as signs, banners, dancing and jigging figures or the like, etc., for the purpose of attracting the attention of persons. The device is primarily intended to be placed in show windows, to attract the attention of passers-by.

The device is one capable of having the figures substituted, so that different figures can be put in motion, and is also one which is capable of having certain parts of the actuating mechanism substituted, by means of which different kinds of motion may be imparted to the figures.

The invention further embodies a number of improvements in the dancing or jigging figures, and in other parts of the mechanism, which will be hereinafter pointed out.

An improved form of oiler is also comprehended in the invention.

An embodiment of the invention is illustrated in the accompanying drawings, wherein:

Figure 1 is a front elevation of an embodiment of the invention (parts being shown in section);

Fig. 2 is a transverse vertical section of the embodiment shown in Fig. 1;

Fig. 3 is a top plan view of the construction shown in Fig. 1, parts being omitted;

Fig. 12 is a detail view of a device for supplying oil to the moving parts.

Figure 4:
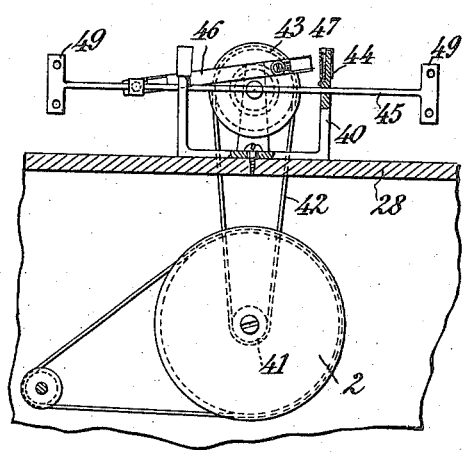
Fig. 4 is an elevation (parts being shown in section) of a part of an actuating mechanism which may be substituted for that shown in Fig. 1, and for producing a different sort of motion.

In said drawings, numeral 1 designates a motor, preferably an electric motor, which drives a pulley 2 turning on shaft 3. 4 designates a frame or actuator adapted to be moved up and down by the pulley 2, through the intermediary, for example, of a connecting rod 5. Guides or bearings 6 and 7 are provided for the frame or actuator 4. The actuator 4 is provided with one or more uprights 8, preferably in the form of socket pieces, the sockets of which are oval, as indicated by the numeral 9 in Fig. 3.

Figures 10, 11:
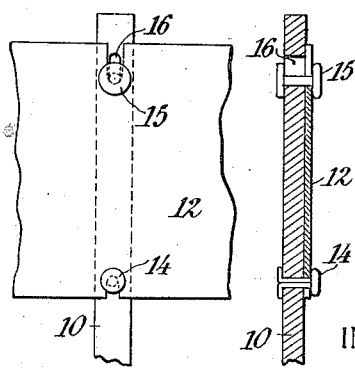
Figs. 10 and 11 illustrate details of construction of a movable standard adapted to carry substitutable signs.

Various figures or signs are adapted to be put in motion by the upright pieces 8. For example, the center socketed upright 8 may actuate a standard 10, the standard 10 having an oval tang 11 adapted to fit in the oval socket in the piece 8, and thereby prevent the standard 10 from turning. The standard 10 may carry a sign 12, which is preferably adapted to be detached and substituted by others. Means, such as buttons 14 and 15 (Figs. 10 and 11), one of which, as the button 15, may be slidable in a slot 16 to permit of a sign being displaced and substituted by another. The standard 10 may carry a cushioned stop or buffer 17. This stop or buffer 17 has the function of stopping the standard 10 in its downward movement, prior to the completion of the downward movement of the actuator 4. By this means the standard 10 has a less extensive up and down movement than the actuator 4.

Figure 8:
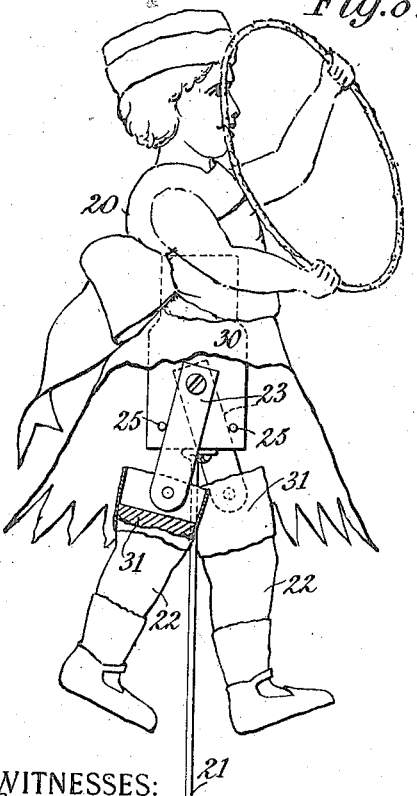
Fig. 8 is a view (parts being shown in section) of one of the dancing figures.

On each side of the standard 10 there is preferably a pair of dancing figures. A dancing figure, designated by numeral 20, is illustrated in detail in Fig. 8. The dancing figure 20 has a rod or wire 21 therein, preferably round in contour and adapted to fit in the sockets in the socketed uprights 8, 8, the fit between the wire 21 and the sockets being such that the figures may turn, and also wabble a bit. The legs 22 upon the figures are preferably attached to the bodies by means of links 23, by means of which the legs may bend. The links 23 are limited in their movement by pins or stops 25. These pins or stops 25 coact with strips or cleats 27 (best seen in Figs. 1 and 2) upon a platform 28, to produce a dancing motion of the figures, now to be described.

As the actuator moves up and down the figures or dancers 20 also move up and down. On the down motion the legs strike against the floor, causing them to bend, and to swing, as the dancer is carried up by the actuator 4 upon a succeeding upward movement. As the dancer comes down again one of the legs is perchance in a position to strike against one of the strips or cleats 27. The leg 22 and the link 23 being very nearly in line at this moment, and further movement of the link 23 being prevented by the stop 25, the leg 22 hits stiffly against the strip or cleat 27, producing a reaction upon the figure, which turns or spins it around. The wire or rod 21, fitting loosely and rotatably in the socket piece 8, permits the figure to turn, and also to wabble or lunge to an extent, the effect of the figure, as it turns, first one way and then another, dips, bends, and goes up and down, producing very much the semblance of an animated dancer.

The dancing figures may be conveniently made up from ordinary celluloid dolls. The body may be cut, and a wooden plug 30 inserted in the hollow thereof. Wooden plugs 31 may be inserted in the hollows of the legs. The links 23 are attached to the plugs 30 and 31 and connect the body and links.

Figure 5:
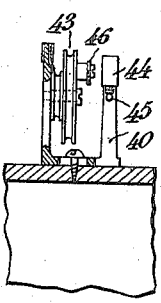
Fig. 5 is a vertical transverse section of the construction shown in Fig. 4.
Figure 9:
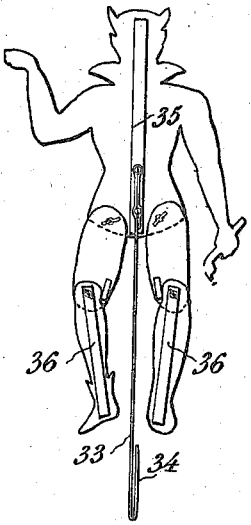
Fig. 9 is a rear view of one of the dancing or jigging figures.

Instead of a turning figure, a figure which does not turn in jigging may be substituted for one of the dancers 20. Such a figure is shown in Fig. 9. It is connected to the socket upright 8 by means of a rod or wire 33 which is preferably bent up at the end, as at 34, this bend fitting in the oval socket, preventing turning of the figure. The prevention of turning is desirable where the figure is made of cardboard and where the working parts in the figure are disclosed in the rear. A stiffening rib 35 may be applied to a cardboard body, and stiffening strips 36, 36 may be applied to the legs.

Where it is desirable to impart a different primary motion to the figures, than an up and down motion, as that of the actuator 4 in Figs. 1 and 2, an actuator 40, as illustrated in Figs. 4 and 5, may be substituted. The pulley 2 preferably has at the rear thereof a small pulley 41 around which passes a belt 42, which actuates a pulley 43 carried in a suitable frame 44, which frame is preferably detachably connected to the platform 28.

In the frame 44 there is mounted a reciprocatory rod 45, the reciprocatory movement being imparted thereto by a connecting rod 46 connected to the rod 45, and to a crank pin 47 upon the pulley 43. Suitable figures may be attached to the attachment pieces 49 upon the ends of the rod 45, and be actuated by the rod 45.

Figure 7:
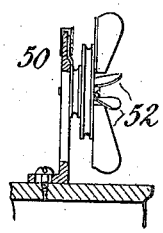
Fig. 7 is a transverse section of the construction shown in Fig. 6.
Figure 6:
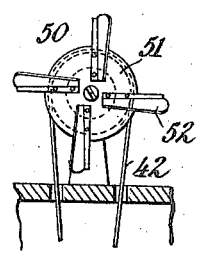
Fig. 6 is a front elevation of another part of the actuating mechanism which may be substituted for the actuating mechanism shown in Fig. 1.

Instead of the actuators 4 and 40 shown in Figs. 1 and 2 and 4 and 5, an actuator 50, as illustrated in Figs. 6 and 7, may be used. The actuator 50 comprises the pulley or hub 51 carrying blades 52 which, when in motion, are adapted to set up a breeze to float a flag or banner. The pulley or hub 51 may be driven by a belt 42, passing over the small pulley 41 on the large pulley 2, as in Figs. 1 and 2 and 4 and 5.

At the rear of the platform 28 there is preferably arranged a plurality of mirrors 60 and 61. These mirrors behind the moving parts add to the impression created by the color and movement of the animated figures. The mirrors are preferably detachable from the platform, and preferably have curved surfaces whereby the effect may be rendered more noticeable. At the rear of the platform there is preferably a back 70, which may serve as a support for the mirrors. Upon the back 70 there is preferably a flanged support 71, adapted to hold the lower edge of a sign or placard which is adapted to be attached to the back 70 and project into view above the back 70. A suitable device, as a screw 72, may be provided for fastening the card or placard to the back 70.

The sliding parts of the device are conveniently lubricated by means of strips of fabric, preferably felt 80, which are saturated with oil, and which are retained in holders 81, preferably of sheet metal bent to tubular form, and attached to one of the parts. The lubricator is shown in detail in Fig. 12. The sheet metal tubular part may be slipped over a prolonged part 83 of one of the parts, and held thereon by suitable means, as, for example, a pin 84.

The bearing 6 may be lubricated by a piece of felt 80, saturated with oil, and held in place by a suitable plate 86.

The inventive ideas may receive other mechanical expressions than those herein specifically illustrated and described.

What I claim is:—

1. An advertising device, comprising a reciprocatory actuator, a figure rotatably mounted on said actuator, and a platform having means thereon adapted to coöperate with said figure to turn it as it moves up and down.

2. An advertising device, comprising a reciprocatory actuator, a figure rotatably and loosely mounted on said actuator, said figure being adapted to wabble somewhat with relation to said actuator.

3. An advertising device, comprising a reciprocatory actuator, a figure rotatably mounted on said actuator, said figure having hinged legs, and a platform having means thereon adapted to coöperate with said figure to turn it as it moves up and down.

4. An advertising device, comprising a reciprocatory actuator, a figure rotatably mounted on said actuator, a platform having means thereon adapted to coöperate with said figure to turn it as it moves up and down, and stops adapted to limit the bending of the legs, whereby said legs when they strike said means on the platform are prevented from bending.

5. An advertising device, comprising a reciprocatory actuator, a figure rotatably and loosely mounted on said actuator, said figure being adapted to wabble somewhat with relation to said actuator, said figure having hinged legs, and a platform having means thereon adapted to coöperate with said figure to turn it as it moves up and down, and stops adapted to limit the bending of the legs, whereby said legs when they strike said means on the platform are prevented from bending.

6. An advertising device, comprising an actuator, a figure to be set in motion, an oval socket in said actuator, and a part on said figure adapted to set in said oval socket.

7. An advertising device, comprising an actuator, a figure to be set in motion, an oval socket in said actuator, a part on said figure adapted to set in said oval socket, and a stop on said figure adapted to limit its motion to less than that of the actuator.

8. An advertising device, comprising a reciprocatory actuator, a plurality of connections therein for devices to be set in motion by said actuator, a sign adapted to be connected to one of said actuator connections, a connection between said actuator and sign and adapted to prevent turning of the sign and a device adapted to be set in motion by said actuator, and a connection between said device and actuator permitting turning of said figure.

9. An advertising device, comprising a reciprocatory actuator, a plurality of connections therein for devices to be set in motion by said actuator, a sign adapted to be connected to one of said actuator connections, a connection between said actuator and sign and adapted to prevent turning of the sign, and a plurality of dancing figures on each side of said sign, and connections between said figures and actuator.

10. An advertising device, comprising a device or figure to be set in motion, and a mirror having curved surfaces behind said device.

11. An advertising device, comprising an actuator, a device or figure adapted to be set in motion by said actuator, and a mirror behind said device, said figure and the reflections thereof being directly observable.

12. An advertising device, comprising an actuator, a dancing device or figure adapted to be set in motion by said actuator, and a mirror behind said device, said figure and the reflections thereof being directly observable.

13. An advertising device, comprising a cabinet, a motor in said cabinet, a platform or top on said cabinet, an actuator, devices on said platform adapted to be set in motion by said actuator, a back behind said platform, and a mirror detachably connected to said back.

In witness whereof, I have hereunto signed my name in the presence of two subscribing witnesses.

CLINTON H. LEGGETT.

Witnesses:
 OLIVER T. ROGERS,
 IRMA SILVERSTEIN.